United States Patent [19]
Jerome

[11] Patent Number: 6,048,157
[45] Date of Patent: Apr. 11, 2000

[54] TURKEY COOP UNLOADING APPARATUS AND METHOD

[76] Inventor: Wallace H. Jerome, 1480 E. Maple Ave., Barron, Wis. 54812

[21] Appl. No.: 08/960,278

[22] Filed: Oct. 29, 1997

[51] Int. Cl.⁷ .................................................. B65G 67/24
[52] U.S. Cl. .......................... 414/393; 414/395; 414/809; 119/845
[58] Field of Search ............................. 414/268, 271–272, 414/352–353, 391–393, 395, 417–418, 502–503, 521, 574, 585, 811, 809; 119/843, 845

[56] References Cited

U.S. PATENT DOCUMENTS

| | | | |
|---|---|---|---|
| 1,657,076 | 1/1928 | Fitch | 414/373 |
| 2,562,539 | 7/1951 | Ellis et al. | |
| 2,626,698 | 1/1953 | Appel | 198/65 |
| 3,110,388 | 11/1963 | Elliott et al. | 198/43 |
| 3,234,915 | 2/1966 | Sanders | 119/97 |
| 3,253,577 | 5/1966 | Lund | 119/843 |
| 3,260,239 | 7/1966 | Sanders | 119/97 |
| 3,420,211 | 1/1969 | Martvickson | 119/846 |
| 3,470,852 | 10/1969 | Bright | 119/843 |
| 3,782,398 | 1/1974 | Powell et al. | 134/133 |
| 3,809,269 | 5/1974 | Lundahl | 414/502 |
| 3,863,781 | 2/1975 | Butzow et al. | |
| 3,895,727 | 7/1975 | Rucker | |
| 3,958,536 | 5/1976 | Crowder | 119/82 |
| 4,084,714 | 4/1978 | Williams | |
| 4,112,872 | 9/1978 | Van Huis | 119/22 |
| 4,215,654 | 8/1980 | Parker, Jr. | 119/97 |
| 4,242,029 | 12/1980 | Musgrave | 414/413 |
| 4,272,863 | 6/1981 | Parker, Jr. | 17/44.1 |
| 4,600,351 | 7/1986 | Nelson | 119/846 |
| 5,108,345 | 4/1992 | Harben, III et al. | 452/183 |
| 5,288,201 | 2/1994 | Pippin | 414/795.8 |
| 5,325,820 | 7/1994 | Briggs et al. | 119/846 |
| 5,388,948 | 2/1995 | Jerome | 414/425 |
| 5,466,116 | 11/1995 | Jerome | 414/786 |
| 5,470,194 | 11/1995 | Zegers | 414/786 |
| 5,505,582 | 4/1996 | Jerome | 414/501 |
| 5,553,988 | 9/1996 | Horn et al. | 414/416 |
| 5,735,664 | 4/1998 | Jerome | 414/416 X |

FOREIGN PATENT DOCUMENTS

| | | | |
|---|---|---|---|
| 1376993 | 2/1988 | U.S.S.R. | 119/843 |
| 2106070 | 4/1983 | United Kingdom | 414/392 |

OTHER PUBLICATIONS

P. 39 from *Turkey World* (Jan., Feb., 1992) re turkey harvester of Bright Coop, Inc.
Two–page flier of Bright Coop, Inc., on the Bright Poultry Cage.
Two–page flier of Lanson Industries, Inc., on its poultry container.
Four–page brochure on poultry cages of Anglia Autoflow Ltd.
One–page flier on fold–out turkey coops of Koecher Mfg., Co.
Three–page brochure of Carfed on containers sold under its GIANT® brand.
P. 44 of *Broiler Industry* (Oct. 1992) re Cage Dumper of Bright Coop, Inc.
Two–page flier of Tamdev Ltd. on its APS4000 chicken unloading system.

*Primary Examiner*—James W. Keenan
*Attorney, Agent, or Firm*—Merchant & Gould P.C.

[57] ABSTRACT

An improved method and apparatus for emptying a load of turkeys from multilayer containers is disclosed. Each container or coop includes a liftable gate that enables access into the container and a slidably moveable push member that may also comprise the back wall of the container. The push member is moved from the rear of the container and toward the access port thereof. As the push member moves and engages turkeys in the coop, the turkeys are moved by the push member across the container floor and out of the access port onto a series of conveyors. The push members of a plurality of coops can be interconnected to simultaneously unload a plurality of containers. The mechanisms for moving the push member may be mounted externally of the coop structure. The same mechanism may also be used for returning the push member to and for locking it in its initial transport position.

4 Claims, 6 Drawing Sheets

TURKEY COOP UNLOADING APPARATUS AND METHOD

CROSS-REFERENCE TO RELATED PATENTS

The disclosures of my prior U.S. Pat. No. 5,388,948 issued Feb. 14, 1995; U.S. Pat. No. 5,466,116 issued Nov. 14, 1995; and U.S. Pat. No. 5,505,582 issued Apr. 19, 1996 and U.S. patent applications Ser. No. 08/578,170 filed on Dec. 29, 1995 entitled Apparatus and Method for Unloading Poultry from Multi-layered Containers, now U.S. Pat. No. 5,735,664; and Ser. No. 08/874,084 abandoned, filed Jun. 12, 1997, entitled Turkey Coop Unloading Apparatus and Method, are hereby incorporated by reference.

FIELD OF THE INVENTION

This invention relates generally to the unloading of contents of multi-layered containers, and more particularly to a method and apparatus for unloading live poultry, and particularly turkeys, from a plurality of multi-level coops on a transport truck, with minimal damage to the turkeys.

BACKGROUND OF THE INVENTION

Poultry, and in particular turkeys are typically housed for transport to processing plants in multi-layered cages, coops or containers carried by a large transport vehicle bed such as a flatbed trailer truck. Unloading of the turkeys at, for example, a processing plant, in a systematic manner so as to avoid piling or congestion of the turkeys in the unloading area and so as to avoid damage to the turkeys has long been a problem. The reader will understand that while the invention will hereafter be described with respect to the handling and processing of turkeys from transport trucks, the principles of this invention are not to be limited thereby. The apparatus and unloading processes described in this patent and to which this invention pertain could well be applied to the unloading of other types of cargoes.

Live poultry is generally transported to modern processing plants on large flatbed truck trailers carrying the poultry in multi-layered cages or coops. A transport truck typically carries as many as 160 coops for chickens, holding approximately 13,200 chickens and as many as 120 coops for turkeys, holding approximately 1,440 turkeys. The poultry cages or coops are generally multi-level, usually six levels high for turkeys and up to 12 levels high for chickens.

The coops used for transporting turkeys are normally mounted on both sides of the transport truck trailer, with their coop doors or gates facing the outside of the trailer. The multi-level cages generally are stacked from 8–10 feet high, are built in sections of 8–16 feet long, and are generally about 45 inches in depth, with approximately a 6 inch ventilation air space provided between the coops down the middle of the truck. The doors of such turkey transport coops generally lift up and slide back into the coop at their tops, in overhead door manner. Such coops are generally illustrated in my prior referenced U.S. Pat. Nos. 5,388,948; 5,466,116; and 5,505,582 and in my pending patent application Ser. No. 08/578,170 filed on Dec. 29, 1995. The reader is referred to such cross-referenced materials for a more detailed description of the coop and transport structures.

Unloading of turkeys from their carrying cages or coops of the transport vehicle and into a processing facility, has long been a problem for the processing industry. Such unloading has been very labor intensive, is difficult and often dangerous to the person doing the unloading, is traumatic to the bird being handled, and often results in injury or damage to the bird.

Due to the large size of turkeys, their unloading has generally been performed or assisted by hand, wherein an unloading person typically opens one coop at a time and individually removes each turkey from its transport cage, either lifting the bird into its confining shackles for processing within the plant, or placing the bird on a conveyor belt leading into the plant for subsequent anesthetizing and handling. Since Tom turkeys generally weigh between 25 and 40 pounds, the unloading task is extremely strenuous, time consuming and difficult—and the turkeys are generally uncooperative in the process. The process can also result in undesirable damage to the turkey, which is accentuated by the fact that larger turkeys are more susceptible to injury if roughly handled.

As described in my prior cross-referenced U.S. patents, a typical turkey unloading sequence of the prior art, wherein the turkeys are directly placed into shackle-containing conveyors, is very labor intensive and often results in damage and contamination to the turkey carcass which results in downgrading of the carcass quality. My prior patents disclosed automated techniques for unloading turkeys from the stacked coops onto conveyor belts moving into a processing plant, by successively lifting the backs of the turkey coops so as to pivot the coops about their lower front edges, thereby depositing the turkeys from a tilted coop onto an adjacent conveyor belt. My cross-referenced pending application Ser. No. 08/578,170 provides an alternative method and apparatus for automatically unloading turkeys from the transport vehicle, by providing an automatic system that successively empties the contents from the coops on the transport truck and onto conveyor belts moving into the processing plant, without requiring the lifting or tipping of any of the coops on the truck. The apparatus and method of my referenced patent application enables the transport truck to be systematically emptied by progressively removing the contents of coops, one at a time by the use of an indexing carriage assembly, without the necessity of any human intervention, until the truck is completely empty.

While the method and apparatus described in my prior cross-referenced application provides for a totally automated system, the indexing carriage nature of its structure may require the use of more expensive and higher maintenance apparatus than some processing plants are willing to invest. The present invention provides an efficient, simplified and economical alternative to the methods disclosed in my prior application and patents, which requires some operator support in manipulating the turkey coops, but in a manner that doesn't require the operator to touch or directly handle any of the turkeys during the unloading operation. As with my prior inventions, the moving and urging of the turkeys during the unloading process is performed in a manner which is humane and noninjurious or traumatic to the turkeys, thereby enhancing their carcass value while still significantly reducing the costly labor intensive unloading processes typically practiced by prior art techniques.

SUMMARY OF THE INVENTION

This invention provides an improved method and apparatus for gently, reliably and efficiently unloading poultry, and particularly turkeys, from multi-layer loads of turkey coops onto an input conveyor for a poultry processing facility. The invention provides an improved coop configuration which facilitates automated unloading of the transport load of coops. The invention also provides a semi-automated unloading assembly for simultaneously unloading turkeys from a plurality of coops of the transport load, in successive progressive manner, until all of the coops of the load have been emptied. According to a preferred embodiment of the invention, the unloading operation is performed automatically except for operator intervention in selecting the coops to be emptied, in simply attaching the unloading apparatus to such coops to initiate an unloading process, and in detaching the apparatus from the coops after they have been emptied. The method and apparatus of this invention eliminates the need for unloading operators to physically unload turkeys from the coops of the transport load, thereby significantly reducing labor costs, the most costly step of prior unloading processes, and significantly reducing injury to the unloading operators that inherently resulted from prior unloading operations.

According to one aspect of the invention there is provided a turkey coop suitable for automated or semi-automated unloading, comprising: (a) a top wall; (b) a pair of oppositely disposed side walls; (c) a back wall; (d) a floor oppositely disposed from said top wall; said floor and said top, side and back walls collectively defining an internal cavity for housing a plurality of turkeys, and an access port opposite to said back wall opening into said internal cavity; (e) a moveable gate; (f) means operatively mounting said gate across said access port in opposing relationship to said back wall for selectively opening and closing access to said internal cavity through said access port; (g) a push member operatively movably mounted to the coop and extending across the internal cavity between the side walls; and (h) means operatively connected with the push member for moving the push member across the internal cavity and over the floor in the direction from said back wall toward said access port; thereby pushing turkeys across the floor and out through the access port. According to a further aspect of the invention, the back wall of the turkey coop is moveable and comprises the push member. The push member may be secured to a push bar which laterally extends from side to side across the internal cavity and adjacent the top wall of the coop such that the push member is suspended for movement above the floor, and the push bar and attached push member assembly is slidably supported by rail members connected to the coop. According to a further aspect of the invention, the turkey coop further includes at least one lock member for releasably securing the push member in fixed position adjacent the back of the coop.

According to yet another aspect of the invention, there is provided a turkey unloading apparatus for unloading turkeys from a transport load of turkey coops stacked in ordered rows and columns, wherein the coops are of the type having walls defining an internal cavity, a moveable gate for selectively opening and closing an access port into the coop internal cavity, and a generally vertical push member slidably moveable relative to the coop in a direction from back to front, toward the access port, and above a floor of the coop, wherein the unloading apparatus comprises: (a) a conveyor apparatus having (i) an unloading conveyor extending generally along the length of a row of coops comprising the transport load; (ii) a cross-over conveyor extending generally along the length of the row of coops disposed between the row of coops and the unloading conveyor; and (iii) means suitable for selective connection to the coop push members for moving the push members of selected coops toward the respective access ports of the selected coops; whereby turkeys housed by said selected coops are pushed by said push member out of the access port of the coops and onto the cross-over conveyor; and (b) conveyor positioning means operatively connected with a conveyor apparatus for selectively raising and lowering the conveyor apparatus relative to the height of the transport load. The invention may also include retraction means operatively connected with the push members for returning the push members toward the back of their respective coops following an unloading cycle. Such retraction means may comprise one or more hydraulic cylinders and the means for moving the push members may comprise one or more cable winch assemblies. The hydraulic cylinders and cable winch assemblies may be mounted on the conveyor apparatus.

According to yet a further aspect of the invention, there is provided a method of unloading turkeys from a transport coop of the type having an openable gate closing an access port into the coop and a push member slidably moveable within an internal cavity of the coop from the back of the coop toward the access port, comprising the steps of: (a) aligning a turkey receiving means adjacent and below the coop access port; (b) opening the gate of the coop; (c) mechanically moving the push member of the coop from the back of the coop toward the access port; and (d) pushing turkeys with the moving push member across a floor of the coop and out of the access port onto the receiving means wherein the turkey receiving means comprises a conveyor apparatus which comprises a cross-over conveyor and an unloading conveyor.

While the invention will be described with respect to a preferred embodiment or embodiments thereof, it would be understood by those skilled in the art that the invention is not to be limited to the specifics of either the components used or the specifics of the coop structures employed. In particular, a specific push member and push bar arrangement and cable, hydraulic cylinder means for moving such push bar and push member, and a conveyor apparatus will be disclosed. The invention, however, is not to be limited in scope by the use of the specific components or movement means illustrated in describing the preferred embodiment. Further, while a specific technique for unloading a transport load of coops will be disclosed, the unloading process or sequence described is not to be interpreted in a limiting manner. Those skilled in the art will readily envision other techniques, configurations and embodiments of structures which embody the claimed principles of this invention.

BRIEF DESCRIPTION OF THE DRAWINGS

Referring to the Drawing, where like numerals represent like parts throughout the several views.

DETAILED DESCRIPTION OF THE PREFERRED EMBODIMENT

As discussed above, while the present invention could apply to the unloading of any type of material or animal suitable for transport within a plurality of vertical multi-layered containers, cages or coops, the invention will be described with respect to a preferred application of sequentially and systematically unloading turkeys from a plurality of multi-layered columns of transport coops. The general structure of such transport coops and their multi-layered configurations upon a transport vehicle, such as the flatbed of a transport trailer are well-known in the art, and will not be detailed herein. To the extent that a general understanding and overall description of such structures is required, the disclosures of my prior cross-referenced U.S. Pat. Nos. 5,388,948; 5,466,116 and 5,505,582 as well as my pending patent applications Ser. No. 08/578,170 filed on Dec. 29, 1995 and entitled Apparatus and Method for Unloading Poultry From Multi-layered Containers; and Ser. No. 08/874,084, filed Jun. 12, 1997, entitled Turkey Coop Unloading Apparatus and Method, are herein incorporated by reference as though they formed an integral part of this description. To the extent that modifications of the general coop and multi-layer coop configurations typically employed in the prior art and those disclosed in my prior patents and applications are necessary to an understanding of this invention, such details will be hereinafter described in more detail. Those skilled in the art will readily understand and appreciate how the coop structures of prior art configurations can be modified to accommodate the principles of the present invention, and conversely, how the principles of the present invention can be applied to existing coop structures.

Figure 1:
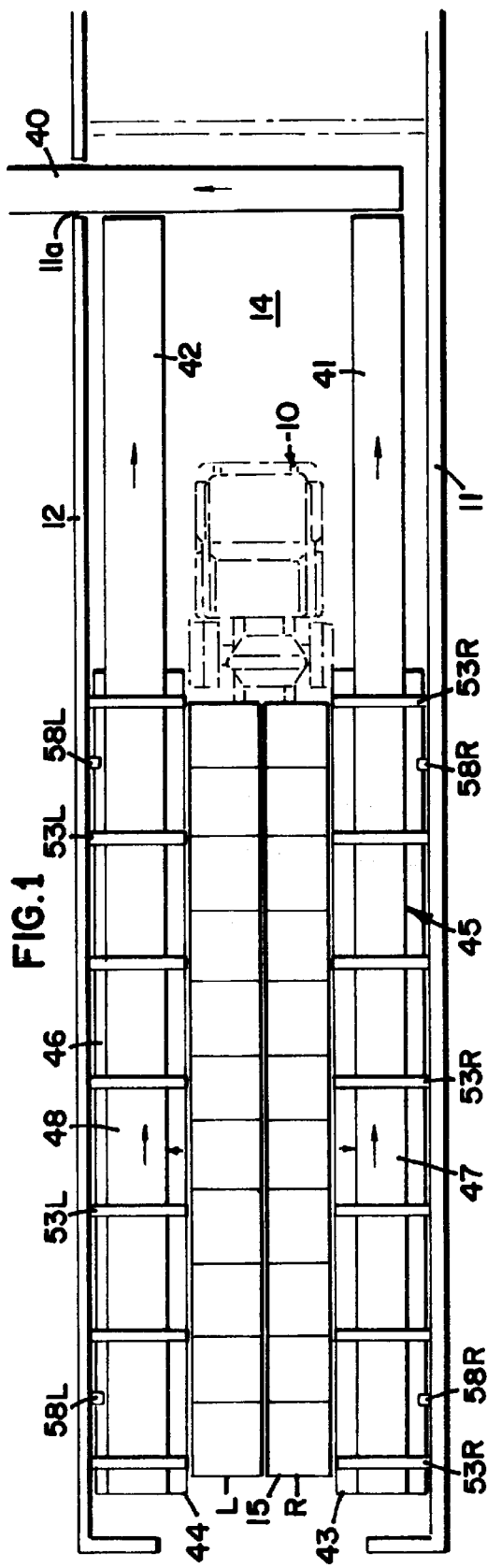
FIG. 1 is a diagrammatic top view of an unloading station at a turkey processing plant of the type to which this invention pertains, illustrating how a transport truck is positioned for unloading its contents, and generally illustrating the positional relationship of the unloading apparatus of this invention relative to the longitudinal sides of the transport truck.

Referring to FIG. 1, a flatbed transport truck of the type often used to transport turkeys to a processing plant, is generally illustrated at 10. The trailer bed or deck of the truck carries a multi-layered plurality of turkey cages or coops 15 that are arranged in two rows (left "L" and right "R") extending in parallel fashion from the front to the rear of the trailer bed respectively. Each of the two rows of coops is divided into a plurality of multi-layered and aligned vertical columns of coops in the manner generally described in my prior referenced applications and patents. In a preferred embodiment, the coops 15 are stacked six high, making six layers or rows of coops requiring emptying at the processing plant. The coops are generally constructed in module configuration, with each module containing from two to four vertical columns or stacks of coops connected together by means of appropriate framing structures. For example, in FIGS. 1 and 2, the left side and right side foremost coop modules on the truck bed each contains three columns of coops stacked six high, yielding a module of 18 coops; whereas each of the two sets of rearmost modules contain four columns of six-high stacked coops, yielding modules of 24 coops. In the preferred embodiment, each coop is approximately four feet wide (in the longitudinal direction of the truck bed), 45 inches deep (in the width direction of the truck bed), and from 14–16 inches in height. The left "L" and right "R" rows of coops are typically separated at their "back" ends along the center of the truck by approximately six inches, to allow ventilation between the two rows of stacked coops.

Figure 3:
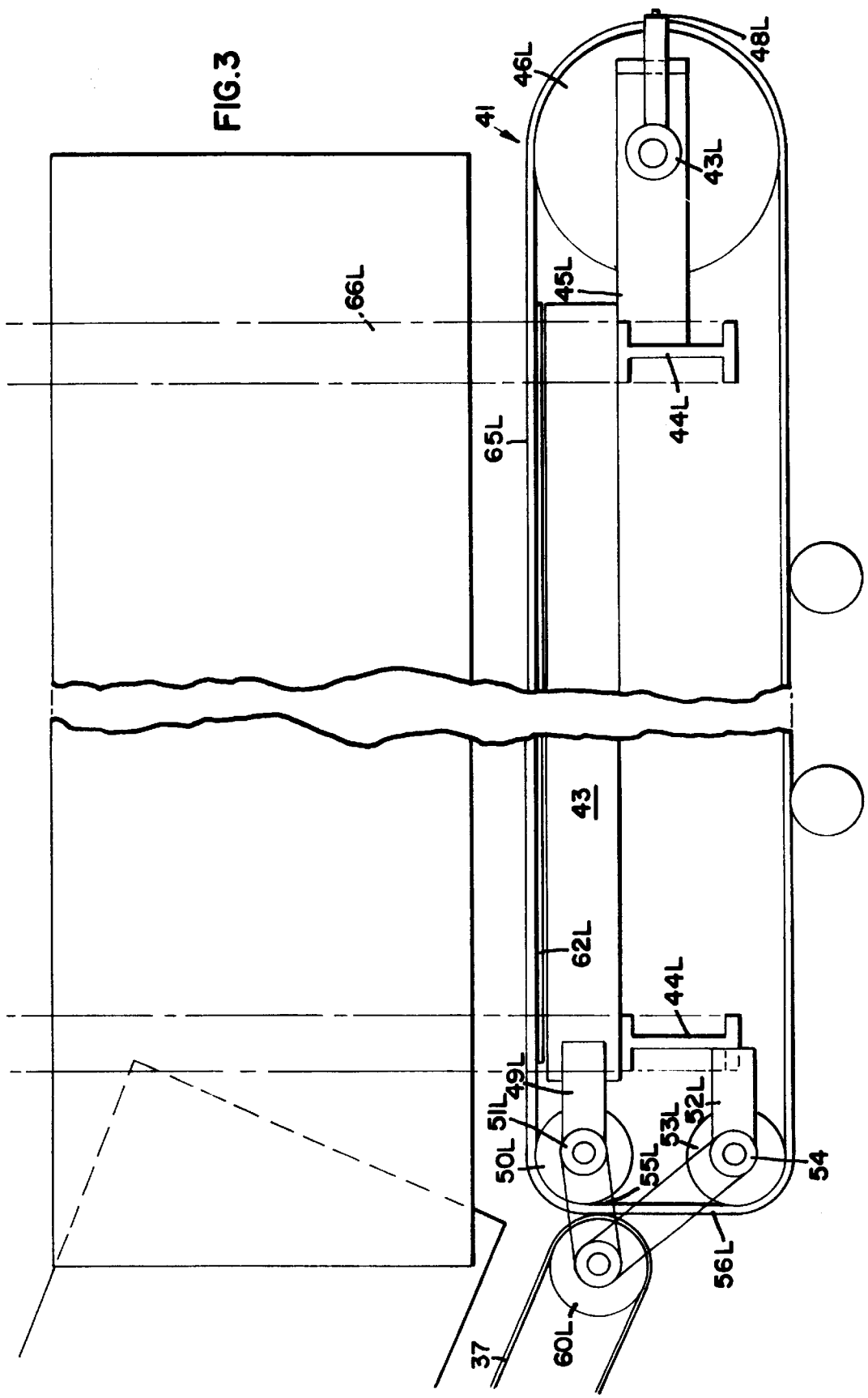
FIG. 3 is a partial perspective view, with portions thereof broken away, illustrating a turkey coop according the present invention (diagrammatically illustrated in FIG. 1)
Figure 4:
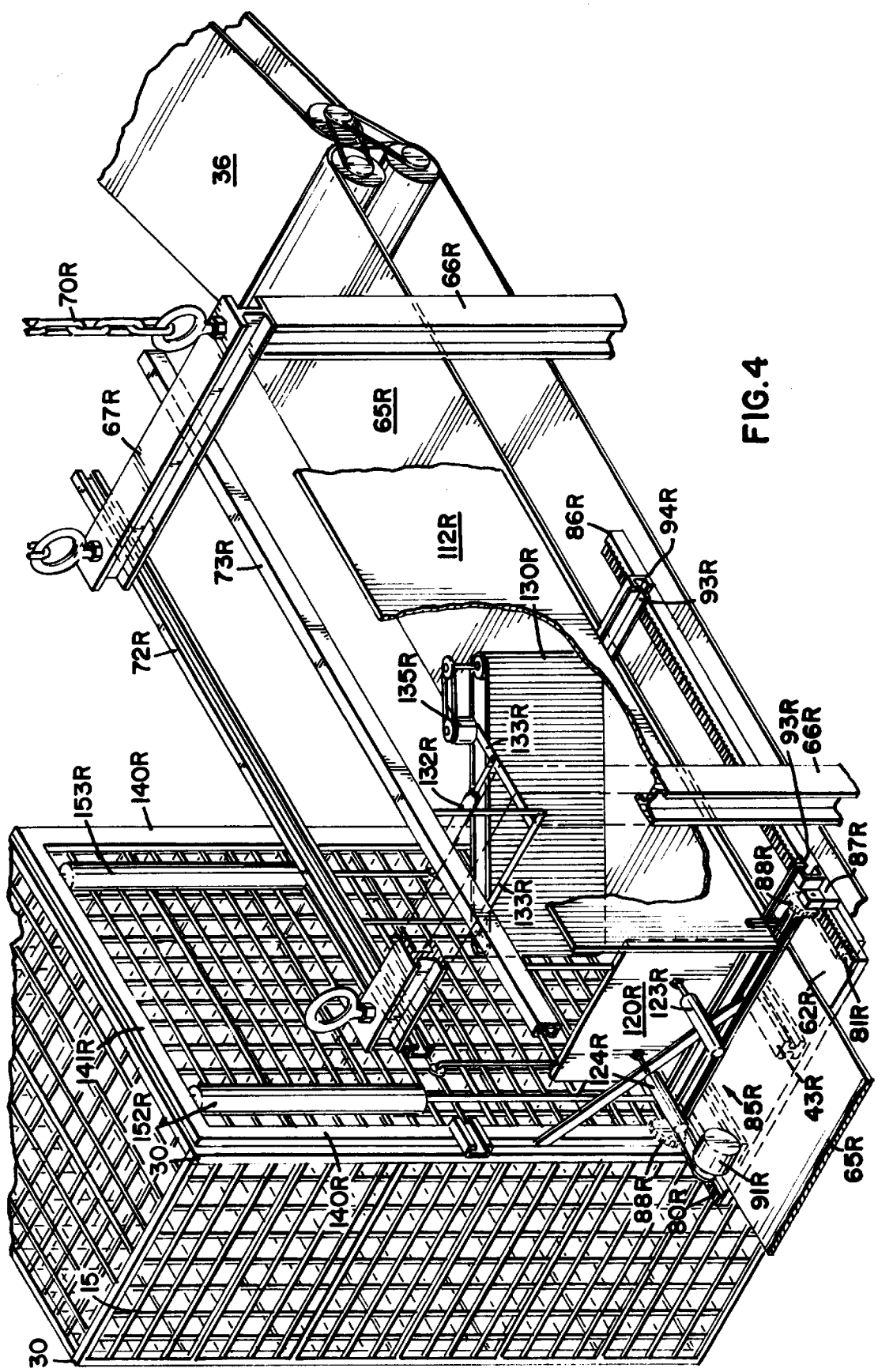
FIG. 4 is a side elevational, cross-section view of the turkey coop of FIG. 3, generally viewed along the Line 4—4 of FIG. 3.

As is typical of coops in the industry, each coop has a top, side and rear walls formed from a wire mesh material (having one inch×two inch mesh openings in the preferred embodiment) and a front mesh gate member 19 mounted for sliding pivotal motion in overhead-door manner relative to the front of the coop, such that when in an "open" position, the coop door or gate lies generally parallel to and in close proximity with the top mesh portion of the coop, as illustrated in FIG. 4. The more detailed description of the general operation of such coop assemblies can be found in my prior referenced application and patents, and will not be detailed herein. Each coop has a solid bottom floor member (not illustrated) which can be fixedly secured in the coop or slidably removable therefrom for cleaning and replacement, as is well-known in the art. Such floors may also replace or make unnecessary the top mesh portion of coops positioned beneath the top coop, as the bottom surface of the floor of an overlying coop also acts as the top of the lower coop. The coop floor structure does not require the automatic removable sliding detail of my prior referenced pending application, since the principles of this invention do not require the floor to move during an unloading operation. For ease of understanding operation of the present invention and its support structure, the floor and wall portions of the coops have not been illustrated in FIGS. 2–7 of the Drawing.

The coops are supported in their stacked module orientation by means of a plurality of upright corner post members in a manner typical of that used in the art. In the Figures, the rear upright corner post members are indicated at 30, and the front upright corner posts are indicated at 31. The corner posts are interconnected in the longitudinal direction of the transport vehicle by means of a plurality of crossframe members (33, 34) respectively. The crossframe members 33 are welded to the rear upright corner post, and the crossframe members 34 are welded to the front upright corner posts. The vertical spacing between the respective rear crossframe members 33 and the respective front crossframe members 34 are the same throughout the stacked coop assembly and define the vertical height definition for each of the stacked coops 15. The front and rear upright corner posts are also connected by means of a plurality of transversely extending (from front to rear) coop side frame members 35 which support the floor portions (not illustrated) of the respective coops. As with the front and rear crossframe members, the coop side frame members 35 are welded to the respective rear and front corner posts (30, 31). The rear and front upright corner posts (30, 31), the rear and front crossframe members (33, 34) and the side frame members 35 collectively provide a structural support framework for the stacked coop modules. The coop screening (not illustrated) which forms the top and sidewall portions of the coops is secured to the above-described support framework members.

In the preferred embodiment of the invention, the rear wall of the standard coop construction has been replaced with a moveable (from rear to front) rear wall 16, to be described in more detail hereinafter. While a preferred configuration of a turkey coop has been described, it will be understood by those skilled in the art that other variations of the coop structure can be configured and used in association with the principles of this invention.

Figure 2:
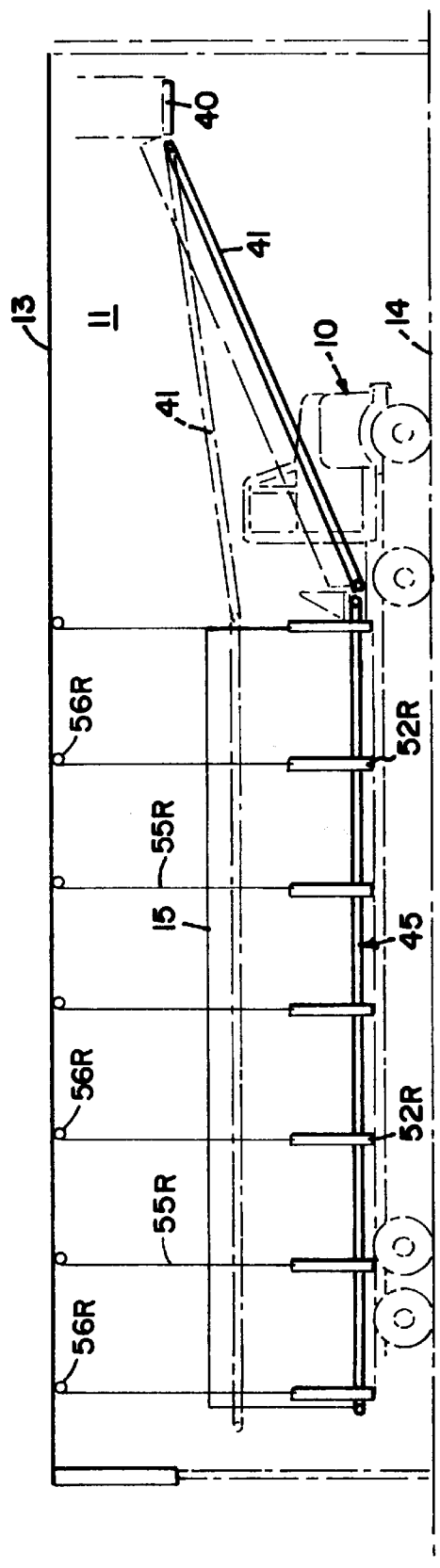
FIG. 2 is a diagrammatic view in side elevation of the transport truck and unloading assembly of FIG. 1.

FIGS. 1 and 2 generally diagrammatically illustrate the positioning of a transport truck during an unloading operation, relative to the unloading apparatus of this invention. For a more detailed description of the general nature of a processing plant into which turkeys unloaded from the transport truck pass, the reader is referred to my prior referenced patents. In general, for the purposes of the following description, the unloading station into which the transport truck moves includes a pair of longitudinal side walls (11 and 12 in FIG. 1), an upper ceiling 13, and a floor 14 which may include wheel guide members (not illustrated) in order to accurately position the truck and its turkey coop load in lateral alignment relative to the turkey unloading assemblies to be hereinafter described. As illustrated in FIGS. 1 and 2, the side wall 11 includes an access port 11a into the processing facility through which the unloaded turkeys pass for further processing within the plant. An elevated conveyor 40 carries the unloaded turkeys through the plant access port 11a into the plant. A pair of incline conveyors (41, 42) connected to and mounted generally perpendicular to the elevated conveyor 40 carry turkeys unloaded from the coops by means of the unloading assemblies to be hereinafter described and deposit the unloaded turkeys onto the elevated conveyor 40. The incline conveyors (41, 42), as well as the elevated conveyor 40 each has associated therewith appropriate side walls (not illustrated) for maintaining turkeys carried by the respective conveyors on the conveyor transport surfaces during movement. The conveyor 40 is elevated above the height of the transport truck cab and the stacked coop portions of the transport truck such that the truck can simply drive in a forward manner under the elevated conveyor before and/or after the unloading operation.

The unloading apparatus of the present invention includes a pair of conveyor platform assemblies generally indicated at (45, 46) in FIG. 1 in their respective relationships as they address the right ("R") and the left ("L") sides of the turkey coop load carried by the transport truck. The right and left (45, 46) conveyor platform assemblies respectively are identical to one another and have a mirror image construction relative to one another for unloading respectively the right and left rows of stacked coop modules of the truck. Accordingly, it is only necessary to describe one of the conveyor platform assemblies, it being understood that the other operates in an identical, but in opposite direction, manner to that of the described assembly. For ease of description, when the same reference number is used to indicate components of either the left or right conveyor assemblies, or such components appear in specific left or right assembly drawings, their reference numbers will be followed by an appropriate "L" or "R" designator.

In the preferred embodiment, each of the right and left conveyor platform assemblies (45, 46) respectively is an integral unit which is vertically and transversely moveable, relative to the transport truck. The conveyor platform assemblies (45, 46) each has appropriate support structure for providing structural support to the assembly and to enable the entire conveyor platform assembly to be operatively raised and lowered. In the preferred embodiment, each of the conveyor platform assemblies (45, 46) operatively supports continuously moving cross-over conveyor belts (43, 44) and unloading conveyor belts (47, 48).

The cross-over conveyor belts (43, 44) and unloading conveyor belts (47, 48) are configured for operation alongside the transport truck when it is docked at the processing facility as illustrated in FIGS. 1 and 2. The cross-over conveyor belts (43, 44) transport the turkeys from the coops 15 onto the unloading belts (47, 48).

The unloading conveyor belts (47, 48) carry the turkeys to the incline conveyors (41, 42) respectively, in manner similarly described in my prior referenced patent and my prior referenced patent application. The "forward" ends of the unloading conveyors (47, 48) are operatively connected with the incline conveyors (41, 42) in a manner similar to that described in my prior patent application and patents for continuously conveying birds unloaded from the transport coops, to the inclined conveyors and eventually to the elevated conveyor 40, and into the processing plant. The unloading conveyors (47, 48) may be of any convenient width, but are preferably from 36 to 45 inches in width. Each conveyor platform assembly (45, 46) includes an operator support platform 50 on which an operator, monitoring and assisting the unloading operation, can walk back and forth longitudinally along the side of the transport vehicle, as further described below. The operator support platform 50 also functions as a foundation for mounting additional portions of the unloading apparatus as hereinafter described in more detail. Each unloading conveyor (47, 48) has associated therewith a retaining wall 49 (shown in FIG. 7 as 49R) longitudinally extending along the outer edge of the unloading conveyors (47, 48) and mounted to the operator support platform 50 (shown in FIG. 7 as 50R) for preventing unloaded turkeys, moving on the conveyors, from falling off of the unloading conveyors (47, 48).

Figure 7:
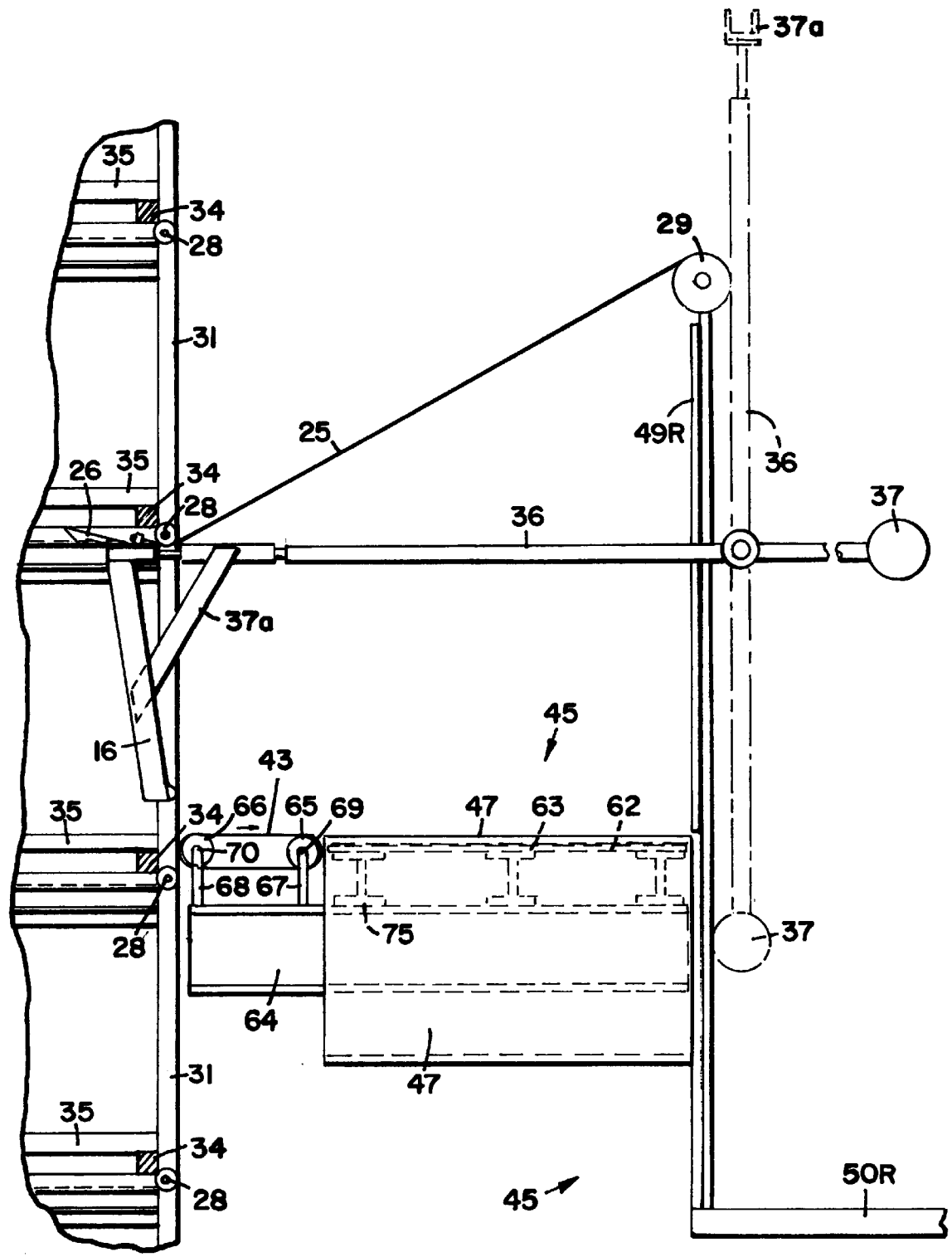
FIG. 7 is a diagrammatic side elevational view of the multi-layered coop structure of FIGS. 1–6 illustrating the push wall of FIG. 4 in a fully withdrawn position, a cross-over conveyor belt, unloading conveyor belt and operator platform as vertically positioned relative to a row of coops being emptied.

As illustrated in FIG. 7, the conveyor platform assembly includes a plurality of longitudinally extending I-beam support members 63. It will be understood that the structure for the conveyor platform assembly 46 is similar to that of conveyor platform assembly 45. Preferably, the I-beam support members 63 extend approximately the length of the coops 15 stacked on a truck, about 45 feet. In a preferred embodiment, there are three such longitudinal support members 63 interconnected by transverse cross-beam members 64. The transverse cross-beam members 64 are preferably secured to the lower surfaces of the longitudinal support members 63. Preferably the transverse cross-beam members 64 are appropriately spaced to align with the turkey coop 15 upright front corner posts 31. Since a typical turkey coop 15 is four feet wide (in the longitudinal direction of the truck bed), the transverse cross-beam members 64 are spaced at four or preferably eight foot intervals. The interconnected longitudinal support members 63 and cross-beam supports 64 form a unified lower support frame for the conveyor platform assemblies (45, 46).

The configuration of a support frame for unloading conveyors (47, 48) is described in my prior referenced patent applications. To the extent that the disclosures of those applications are necessary to an understanding the support structure configuration, they are hereby incorporated by reference.

The configuration of a support frame for cross-over conveyors (43, 44) will now be discussed with reference to FIG. 7. According to the invention, cross-over conveyors (43, 44) extend along the length of the truck and operatively rotate in a direction as shown in FIG. 7. The cross-over conveyors (43, 44) pull the turkeys away from the front opening of the coops 15 to prevent obstruction of the front opening of the coop 15. Additionally, the cross-over conveyors (43, 44) prevent bruising of turkeys as they are removed from the coops 15. If turkeys are pushed directly from the coops 15 onto the unloading conveyors (47, 48), they frequently are only partially out of the coop 15 with some weight on the unloading belt 47 or 48. In this situation, the movement of the unloading conveyors (47, 48) can push the turkey against the coop corner post 31, thereby bruising the turkey.

The cross-over conveyors (43, 44) overcome the problems of turkeys obstructing the opening of the coop 15 and turkeys being bruised by the movement of the unloading conveyors (47, 48). According to the invention, cross-over conveyors (43, 44) are operably mounted to a plurality of cross-over pulley rollers 65 and 66 which are aligned end to end along the length of the truck. According to the invention, the cross-over conveyors (43, 44) rotate in a direction perpendicular to the direction of rotation of the unloading conveyors (47, 48). A first series of cross-over pulley rollers 65 is rotatably mounted proximate the unloading conveyor (47, 48) between pairs of first cross-over pulley support frame extensions 67 (hereinafter "cross-over pulley extensions"). Preferably, the pairs of first cross-over pulley extensions 67 extend upwardly from the transverse cross-beam members 64. As discussed above, the transverse cross-beam members 64 are secured to the lower surfaces of the longitudinal support members 63 appropriately spaced to align with the coop 15 upright front corner posts 31. The series of first cross-over pulley rollers 65 are mounted to the cross-over pulley extensions 67 by appropriate bearing and shaft assemblies in a manner well known in the art, generally indicated at 69. The first series of cross-over pulley rollers 65 are operatively rotated energized one or a plurality of electric or hydraulic motors (not shown) for moving the cross-over conveyor belt 43 in a clockwise direction.

A second series of cross-over idler pulley rollers 66 are rotatably mounted between pairs of second cross-over pulley extensions 68 proximate the coops 15. As with the first cross-over pulley extensions 67, the second of cross-over pulley extensions 68 are secured to the transverse cross-beam members 64. In a preferred embodiment, the first series of cross-over pulley rollers 65 are spaced about 1 foot apart from the second series of cross-over pulley rollers 66. Consequently, in a preferred embodiment, individual cross-over conveyors (43, 44) are about a foot long and about 8 feet wide. When the individual cross-over conveyors are aligned in series, the overall width of the cross-over conveyor (43, 44) is about 45 feet wide, such that the cross-over conveyor (43, 44) extends the length of a truck 10 (see FIGS. 1 and 2).

The conveyor platform assemblies (45, 46) each include a plurality of vertical support beams 52 properly secured to the lower beam support structures of the conveyor platforms (45, 46), at the respective ends of the conveyor platform modules and at appropriate intervals therebetween. The vertical support beams 52 support transverse crossbrace members 53, as illustrated in FIG. 1. The crossbrace supports 53 terminate at their forward ends (those ends which address the transport load) at a position spaced back from the "outside" edge of the conveyor platform assemblies (45, 46), so as not to engage or interfere with the coops carried by the transport truck. The framework structure formed by the conveyor platform assemblies (45, 46), their respective support structures, cross-over conveyors (43, 44), unloading conveyors (47, 48), operator platforms 50, vertical support beams 52, and transverse crossbraces 53, define unified integral assemblies that can be independently or simultaneously raised and lowered from the ceiling 13 of the unloading station relative to the truck 10 and its stacked coops, for unloading the coops, as hereinafter described. The crossbrace support beams 53 are connected by means of cable or chain assemblies (generally indicated at 55) and appropriate lift motors 56 and counterbalanced lift assemblies (not illustrated but well-known in the art) to provide accurate and vertical lifting movement of the entire conveyor platform assemblies (45, 46) relative to the stacked coop assemblies on the truck 10.

The entire conveyor platform assemblies (45, 46) are also preferably transversely moveable toward and away from the outer longitudinal edges of the truck bed, and therefor toward and away from the gate sides of the stacked coop assemblies, by means of appropriate hydraulic cylinder alignment assemblies, connected to and carried by the frame support structure of the conveyor platform assemblies (45, 46) or alternatively connected to the walls 11 and 12 of the unloading station. These alignment structures are generally indicated at 58 in FIG. 1. As the truck is driven into the unloading bay of the processing plant, the hydraulic cylinder placement assemblies 58 will withdraw the conveyor platform modules (45, 46) from the path of the entering truck. Once the truck has been properly positioned between the conveyor platform assemblies (45, 46), and is ready for an unloading operation, the alignment cylinder assemblies 58 will transversely move the conveyor platform assemblies (45, 46) inwardly toward the stacked coop assemblies carried by the transport truck, until the conveyor platform assemblies are in operative unloading position relative to the coops to be unloaded. The lift motors 56 and associated counter balanced winch assemblies will then raise and lower the entire conveyor platform assemblies (45, 46) to the desired height in order to unload an entire level of the coops addressed by such conveyor platform assemblies (as hereinafter described in more detail).

Figure 5:
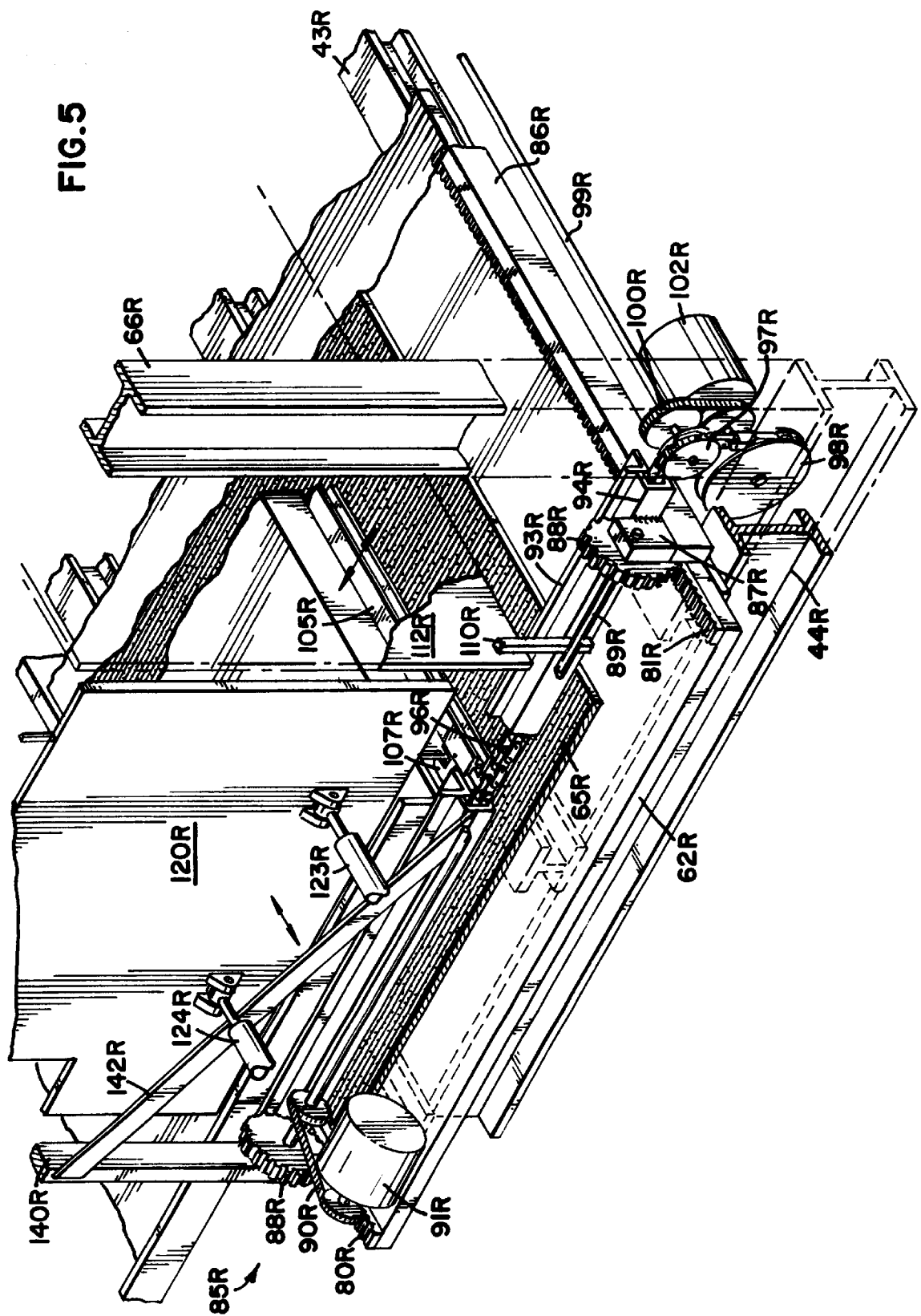
FIG. 5 is a front elevational cross-section view of the turkey coop of FIG. 3, generally viewed along the Line 5—5 of FIG. 3.
Figure 6:
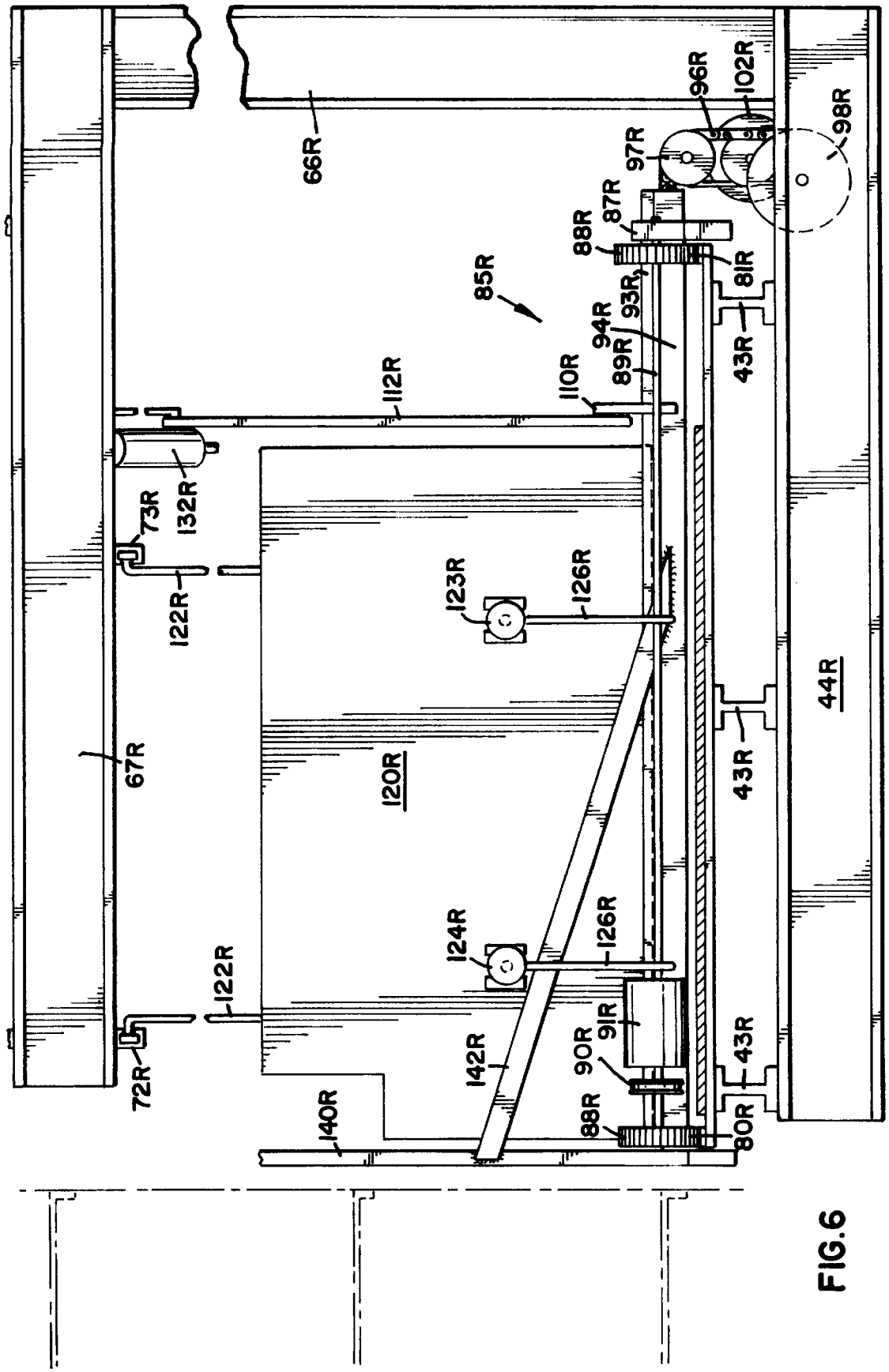
FIG. 6 is a top plan cross-sectional view of the turkey coop of FIG. 3.

Turkeys are unloaded from the coops by means of the moveable back walls 16 of the coops. As the back wall 16 is pulled or moved forward toward the front of the coop, the turkeys engaged thereby are urged toward the open gate of the coop and out of the coop onto the cross-over conveyors (43, 44). The moveable back walls 16 are connected at their upper ends to a push bar 21. In the preferred embodiment, the push bar 21 transversely extends along the back of a plurality of coops and is operatively connected to the tops of the back walls respectively thereof. In the preferred embodiment, the push bar 21 can accommodate up to four consecutively aligned adjacent coops of a row such that when the push bar is moved toward the front of the coops, it simultaneously moves the back walls 16 of all four coops. In the preferred embodiment, the push bar is constructed from one inch by two inch tubing and has a rectangular cross section, as indicated in FIGS. 3 and 4. The moveable back walls 16 may be of solid or mesh construction and of sufficient strength and construction to push the weight of the turkeys held by the coop, toward the front gate. The push bar 21 is supported on and slideably moves along a plurality of push bar support rail members 22. In the preferred embodiment, the push bar support members 22 are configured from 0.075 inch by 0.075 inch angle iron material which is welded to the rear and front upright corner posts (30, 31) in parallel spaced-apart manner to the coop side frame members 35. The number of push bar support members 22 for each unloader assembly will vary, depending upon how many coops are being serviced by the particular unloader assembly. For example, in an unloader assembly wherein the push bar carries four rear walls 16 for emptying four coops at a time, five push bar support members 22 will be used, one at each side of the four coop structures and three at the coop separating walls therebetween. The push bar support members 22 may extend back beyond the rear upright corner posts 30 and into the 6 inch space separating the columns of stacked coops on either side of the transport truck, as indicated in FIGS. 3, 4 and 6, to provide additional support for the push bar 21 and its associated moveable rear walls 16. In the preferred embodiment, each of the moveable walls 16 is connected by means of an angular brace member 17 connected to one edge of the rear wall 16 and extending forwardly and upwardly to a push bar front extension 23. The push bar front extensions 23 are butt welded to the front edge of the push bar 21 and extend forwardly thereof to ride along the upper surfaces of their associated push bar support members 22, as best indicated in FIGS. 3 and 4. The push bar front extensions provide increased stability to the moveable walls 16 to prevent the walls from tending to rotate the push bar 21 in the clockwise direction as viewed in FIG. 4 as forces are being applied to the wall 16 as it pushes against the turkeys being unloaded from the coop when the wall is moving in the forward direction. In the preferred embodiment, the push bar front extensions 23 are approximately 2 inches long. The extensions on the left side of any group of coops (for the right side of the truck) can be longer, to add additional support against push bar rotation. Conversely, for the left side of the truck of the preferred embodiment unloading configuration illustrated, the push bar extensions on the right side of any coop unloading group can be of longer length. A plurality of push bar hold down rails 24 are also connected between the rear and front upright corner post (30, 31) and are aligned parallel with the coop side frame members 35 as indicated in FIGS. 4 and 6, and are vertically spaced from the lower push bar support members 22 so as to slidably engage the upper surface of the push bar 21. The hold down rails prevent the push bar from lifting off of the lower push bar support rail members 22. The sandwiching effect of lower push bar support members 22 and upper push bar hold down members 24 is best illustrated in FIG. 5. In the preferred embodiment, only two push bar hold down members 24 are provided for any one turkey unloading assembly, whether such assembly is used to unload a single coop or a plurality of coops. In the preferred embodiment, the push bar hold down rail members 24 are constructed of 0.75 inch by 0.75 inch angle iron members. As will be appreciated, the push bar support members 22, the push bar hold down members 24 and the push bar 21 and its associated moveable walls 16 are configured for attachment to existing coop framework structures so as not to interfere with the operative portions of such coop structures and to fit in spaces between the existing corner posts 30, 31, crossframe members 33, 34 and coop side frame members 35. Accordingly, the principles of the present invention can be applied to existing stacked coop structures by retrofitting such structures, without requiring total replacement of the existing coop structures. It will be appreciated that the surfaces of the push bar support members 22 and the push bar hold down members 24 which engage the push bar 21 and the push bar front extensions 23 can be appropriately coated with slide enhancing paints or coatings such as Teflon®, or with silicone or other lubricants to facilitate movement of the push bar 21 with respect to them.

As illustrated in FIG. 4, the moveable back wall members 16 are slightly angled toward the front, as extending from top to bottom to facilitate in urging turkeys engaged thereby toward the front of the coop. Each of the moveable gates 16 further has a rubber protector bar member 18 secured along its lower edge to minimize injury to the turkeys being encaged thereby.

The push bar 21 is pulled in the "forward" (from the back of the coop to the gate portion of the coop) direction by means of a pair of cables 25. One end of each cable (25) is connected respectively to one end of a lock member 26 that is pivotally secured to a mounting block 26a welded to the front edge of the push bar 21. The lock member 26 has a rearwardly facing hook portion 26b that engages a keeper strap 27 welded to the back sides of the rear upright corner posts 30. When pivoted counter clockwise (as viewed in FIGS. 3 and 4) to a locked position as illustrated in FIG. 4, the rear wall 16 is secured in fixed position transport at the back of the coop, as illustrated in FIG. 4. This is the position in which the back wall would be configured during transport of the coops and prior to and after unloading. Each of the cables 25 is entrained over a pulley 28 to a cable winch 29 which is secured to the operator support platform of the respective conveyor platform assembly 45 or 46. In the preferred embodiment, the cable 25 is broken just beyond the position of the pulley 28 by means of a connector such that the cable portion extending from the winch 29 can be attached and detached from the portion extending from the pulley and back toward the pivotal lock member 26. Accordingly, that portion of the cable extending between the lock member 26 and the pulley 28 remains with the coop assembly; whereas that portion of the cable extending from the pulley 28 and to the winch 29 forms a portion of the conveyor platform assembly. It is understood that proper support means, not illustrated are provided for keeping the connector portions of the cable that remains with the coops in operative position relative to the pulleys 28. As the winch 29 is operated to place tension on the cable 25, the applied tension will cause the pivotal lock member 26 to rotate about its pivotal axis (in the clockwise direction as viewed in FIG. 4), thereby releasing the hook member 26b from the retaining keeper 27. Further tension applied to the cable will enable the cable to exert forward pulling forces through the lock members 26 and to the push bar 21, causing the push bar and attached rear walls 16 to slide in the forward direction toward the front of the coop. The speed of the two winches 29 operatively connected to any push bar assembly are synchronized so as to uniformly pull the push bar toward the front of the coop. As the back walls 16 of the unloading assembly progress toward the front of the coop, the turkeys engaged thereby are urged toward and out of the open gate of the coop and onto the cross-over conveyor 43. In the preferred embodiment, the cable winches 29 are positioned approximately eight feet apart for each coop unloading assembly, and the cable used is preferably a 3/16 inch cable.

When the coop unloading process has been completed, the moveable wall portions of the unloading apparatus will be positioned near the front of the coop as illustrated in FIG. 7. A pair of return cylinders, generally indicated at 36 are provided for returning the push bar 21 and attached rear walls 16 to their original positions. The return cylinders 36 are pivotally mounted to the operator support platforms 50R as indicated in FIG. 7 by means of a counter balance weight 37 which facilitates movement of the return cylinders 36 into and out of operative engagement with the push bar 21. In the preferred embodiment, the return cylinders 36 are multiple-stage hydraulic cylinders having an engagement cross arm member 37a secured to the free end of the cylinder piston for engaging the forward edge of the push bar 21, as indicated in FIGS. 3 and 6. Alternatively, other return mechanisms such as coil or torsion spring assemblies or reverse cable assemblies could be used for returning the push bar and attached rear walls to their locked position at the rear of the coop.

Electrical and hydraulic circuits of the various motion producing powered components of the apparatus have not been included. It will be understood that those skilled in the art can readily provide the appropriate hydraulic and electrical control circuits needed to operate such components as the winches 29, the cylinders 36, the various conveyor belts employed and the conveyor platform lift motors 56 and alignment cylinder structures 58.

In operation, the transport truck 10 is driven into the unloading dock area of the processing plant and is appropriately positioned by way of wheeled alignment markers or the like centrally of the unloading station and in general operative position relative to the right and left conveyor platform assemblies (45, 46) respectively. Simultaneously with entry of the truck into the unloading station, or prior thereto, the right and left conveyor platform assemblies (45, 46) are lowered by means of their associated motors 56 and cable assemblies 55 such that the tops of the cross-over conveyors (43, 44) are generally positioned at a height slightly lower than the level of the floors of the bottom coops of the stacked coop load to be unloaded. In the pre-unloading condition, the cables of the winch assemblies located on the conveyor platforms (45, 46) will be in retracted positions with their connectors adjacent the pulleys 28, and the return cylinders 36 will be pivoted to their upright positions so as to not interfere with movement of the conveyor platforms (45, 46) relative to the transport truck. The coops of the truck may be loaded either from front to rear or from rear to front, but preferably unloading will begin from the rear coops when the truck is positioned as illustrated in FIGS. 1 and 2. Such unloading sequence will accommodate the longer push bar extension positioning as previously described.

When the transport truck is properly positioned in the unloading station, the right and left conveyor assemblies is (45, 46) respectively are moved into unloading positions directly addressing the gate sides of the lower most row of coops on each side of the transport load, by means of the hydraulic cylinders 58. If further vertical alignment positioning is required, as may be indicated by appropriate limit switches, the lift motors 56 are appropriately energized to provide the proper vertical alignment of the right and left conveyor assemblies. Operators on the operator support platforms 50 of the conveyor platform assemblies (45, 46) select those coops which will be emptied first (the rear most coops in the preferred embodiment) and secure the winch ends of two of the cables 25 to the connector portions of the cables adjacent the pulleys 28 for those coops to be unloaded. The operator then opens the gates 19 of those coops by pivoting the gates upward and locking the gates in an open position by means of the gate lock member 20 (FIG. 4). This operation as well as other operator assisted functions could also be automated. It should be noted that the conveyor platform assemblies (45, 46) can alternatively have a number of winch 29 and return cylinder 36 assemblies mounted therealong to accommodate each of the unloading stations of the transport coop assembly; or alternatively, can have a pair of movable winches 29 and a pair of movable return cylinders mounted to the operator platform for longitudinal movement therealong so that they can be reused for each unloading operation of successive groupings of coops to be unloaded in any row of the stacked coop assembly.

When the pair of winch cables 25 are secured to the appropriate cables of the coops to be unloaded and the doors of the coops are opened, the corresponding pair of winches 29 are energized to simultaneously apply uniform tension to the cables, causing release of the pivotal lock members 26 to which the cables 25 are attached, and pulling the associated push bar 21 in a forward direction toward the open gates. As the winch operates to pull the push bar forward, the attached moveable rear walls 16 urge the turkeys from the respective coops forward and out through the open gates of the coops and onto the respective cross-over conveyor belts 43 or 44. From the cross-over conveyors 43 or 44, the turkeys pass onto the unloading conveyors (47, 48). Preferably the cross-over conveyors (43, 44) are operated at a speed about twice that of the speed of the movable rear wall 16, such that the cross-over conveyors (43, 44) will help to quickly remove turkeys from the coop 15. The unloading conveyors (47, 48) can be individually operator controlled, if desired, to prevent bunching up of the turkeys thereon which may cause injury to the turkeys. The retaining wall 49 prevents the turkeys from falling off of the conveyor. The unloading operation continues until the moveable wall 16 reaches the front of the coop, as indicated in FIG. 7, at which time all of the turkeys from the coop will have been unloaded therefrom onto the cross-over conveyors (43, 44). At that time, the winch pressure is released and the operator pivots the return cylinders 36 into operative engagement (counter clockwise when viewed as in FIG. 7) such that the engagement crossarm members 37*a* thereof engage the front edge of the push bar. The return cylinders 36 are energized to push the retaining bar and associated moveable walls 16 back into their rearmost positions wherein the hook portions 26*b* of the lock members 26 re-engage the keeper strip 27. At that point in time, the return cylinders 36 are retraced and pivoted back to an upright position and the winch cables are disengaged from the connector hook portions of the cable portions 25 that remain with the coops. The operator then moves along the operator support platform to the next unloading station (i.e. to the next group of coops to be unloaded) and repeats the process, unloading the next set of coops. The process is successively repeated until all of the coops of a row or layer of the stacked coop structure have been unloaded. At that point in time, the lift motors 56 will be energized to raise the right and left conveyor platform structures (45, 46) into alignment with the second coop level, for emptying the coops positioned at that level. The operators on the operator support platform will then move back to the rear portion of the transport load for repeating the process until all of the coops of that level have been emptied of their contents. When the entire transport truckload of coops has been emptied, the hydraulic cylinders 58 will be energized to withdraw the left and right conveyor platform assemblies (45, 46) from their respective unloading alignment with the transport truck load so that the transport truck can be driven out of the unloading station.

It will be understood that turkeys unloaded as described above from their respective coops, are carried by their respective cross-over conveyor belts (43, 44) onto a conveyor belt 47 or 48 of the right and left conveyor assemblies (45, 46) and are deposited thereby onto the incline conveyors (41, 42) for redeposit onto the elevated conveyor 40, which carries them into the processing plant. It will be appreciated that the apparatus and method described for unloading turkeys from transport coops provides a safe, rapid and semi-automated process for performing the unloading operation in a simple, cost effective and reliable manner and which minimizes injury and damage to the birds being unloaded.

While the invention has been described with respect to a preferred embodiment thereof, and with respect to specific types of components used therein, it will be understood by those skilled in the art that the invention is not to be limited in any manner by the specifics of either the disclosed embodiment or the components described. Such embodiments and components have been described to illustrate clear examples of how the principles of the invention can be specifically applied. All alternatives and modifications of the foregoing are intended to be covered within the broad scope of the appended claims.

I claim:

1. A turkey unloading apparatus for unloading turkeys from a transport load of turkey coops stacked in ordered rows and columns, said coops being of the type having walls defining an internal cavity, a moveable gate for selectively opening and closing an access port into the coop internal cavity, and a generally vertical push member slidably moveable relative to said coop in a direction from back to front, toward said access port, and above a floor of the coop, said unloading apparatus comprising:

(a) a conveyor apparatus comprising:
(i) an unloading conveyor extending generally along the length of a row of coops comprising the transport load;
(ii) a cross-over conveyor extending generally along the length of the row of coops disposed between the coops and the unloading conveyor; and
(iii) means selectively connectable to said coop push members for moving said push members of selected coops at a first speed toward the respective said access ports of said selected coops; whereby when said push member is moved toward the access port, turkeys housed by said selected coops are pushed by said push member out of the access port of said coops and onto said cross-over conveyor; and (b) conveyor positioning means operatively connected with said conveyor apparatus for selectively raising and lowering said conveyor apparatus relative to the height of said transport load.

2. The turkey unloading apparatus of claim 1, wherein the cross-over conveyor rotates in a direction perpendicular to the unloading conveyor.

3. The turkey unloading apparatus of claim 1, wherein the cross-over conveyor rotates at a second speed which is about twice the first speed.

4. A method of unloading turkeys from a transport coop of the type having a floor, an openable gate closing an access port into the coop and a push member slidably moveable within an internal cavity of the coop from the back of the coop toward said access port, comprising the steps of:

(a) aligning a turkey receiving means adjacent and below the coop access port;

(b) opening the gate of the coop;

(c) mechanically moving the push member of said coop from the back of the coop toward said access port; and (d) pushing turkeys with said moving push member across the floor of the coop and out of said access port onto said receiving means wherein said turkey receiving means comprises a conveyor apparatus comprising:
(i) an unloading conveyor extending generally along the length of a row of coops;
(ii) a cross-over conveyor extending generally along the length of the row of coops disposed between the coops and the unloading conveyor; and
(iii) means selectively connectable to said coop push members for moving said push members of selected coops toward the respective said access ports of said selected coops; whereby turkeys housed by said selected coops are pushed by said push member out of the access port of said coops and onto said cross-over conveyor.

* * * * *